(12) United States Patent
Shitara et al.

(10) Patent No.: US 11,267,515 B2
(45) Date of Patent: Mar. 8, 2022

(54) VEHICLE STRUCTURE

(71) Applicant: Toyota Jidosha Kabushiki Kaisha, Toyota (JP)

(72) Inventors: Masaki Shitara, Nagakute (JP); Yuchi Yamanouchi, Toyota (JP); Ryo Hattori, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 73 days.

(21) Appl. No.: 16/909,470

(22) Filed: Jun. 23, 2020

(65) Prior Publication Data

US 2020/0406979 A1 Dec. 31, 2020

(30) Foreign Application Priority Data

Jun. 28, 2019 (JP) .............................. JP2019-121669

(51) Int. Cl.
*B62D 25/04* (2006.01)
*B60R 11/04* (2006.01)
*B60J 1/18* (2006.01)
*B60J 1/02* (2006.01)
*B60R 11/00* (2006.01)

(52) U.S. Cl.
CPC ................. *B62D 25/04* (2013.01); *B60J 1/02* (2013.01); *B60J 1/18* (2013.01); *B60R 11/04* (2013.01); *B60R 2011/0003* (2013.01); *B60R 2011/004* (2013.01)

(58) Field of Classification Search
CPC . B62D 25/04; B60R 11/04; B60R 2011/0003; B60R 2011/004; B60R 2011/0026; B60R 11/0211; B60J 1/18; B60J 1/02
USPC ...................................................... 296/146.15
See application file for complete search history.

(56) References Cited

U.S. PATENT DOCUMENTS 9,344,611 B2 * 5/2016 Ohsumi ............... H04N 5/2252

FOREIGN PATENT DOCUMENTS

JP 2016-187988 A 11/2016

* cited by examiner

*Primary Examiner* — Pinel E Romain
(74) *Attorney, Agent, or Firm* — Dinsmore & Shohl LLP

(57) ABSTRACT

A division bar that extends in a vehicle width direction and divides at least one of a vehicle front windshield and a vehicle rear windshield into an upper windshield and a lower windshield is included, and cameras and are arranged on the division bar.

4 Claims, 2 Drawing Sheets

VEHICLE STRUCTURE

CROSS REFERENCE TO RELATED APPLICATION

This application claims priority to Japanese Patent Application No. 2019-121669 filed on Jun. 28, 2019, which is incorporated herein by reference in its entirety including the specification, claims, drawings, and abstract.

TECHNICAL FIELD

The present disclosure relates to a vehicle structure having a windshield divided into upper and lower portions.

BACKGROUND

A fixing device that fixes a camera to an inner surface of a vehicle front windshield is disclosed in JP 2016-187988 A.

SUMMARY

When the camera is mounted on the inner surface of the windshield as disclosed in JP 2016-187988 A, the fixing device for mounting the camera on the windshield is required.

It is therefore an object of the present disclosure to provide a vehicle structure that allows a camera to be mounted on at least one of a vehicle front and a vehicle rear without the need for a fixing device for mounting the camera on a windshield.

A vehicle structure according to the present disclosure includes a partition member that extends in a vehicle width direction and divides at least one of a vehicle front windshield and a vehicle rear windshield into an upper windshield and a lower windshield, and a camera is disposed on the partition member.

Providing the partition member that divides the windshield into upper and lower portions and disposing the camera on the partition member as described above makes it possible to provide the vehicle structure that allows the camera to be mounted on at least one of a vehicle front or a vehicle rear without requiring a fixing device for mounting the camera on the windshield.

According to one aspect of the vehicle structure of the present disclosure, the partition member is provided with a vehicle outside view camera and a vehicle cabin view camera.

According to this aspect, providing the vehicle outside view camera and the vehicle cabin view camera makes it possible to record both a vehicle outside view and a vehicle cabin view.

According to an aspect of the vehicle structure of the present disclosure, provided inside the partition member is a reinforcement extending in the vehicle width direction, and left and right ends of the reinforcement are both connected to a skeletal structure of a pillar.

According to this aspect, providing, inside the partition member, the reinforcement that extends in the vehicle width direction and has the left and right ends both connected to the skeletal structure of the pillar makes it possible to maintain sufficient strength of the partition member and increase rigidity of the vehicle structure.

According to the present disclosure, it is possible to provide the vehicle structure that allows a camera to be mounted on at least one of the vehicle front or the vehicle rear without requiring a fixing device for mounting the camera on the windshield.

BRIEF DESCRIPTION OF DRAWINGS

Embodiments of the present disclosure will be described based on the following figures, wherein.

DESCRIPTION OF EMBODIMENTS

A vehicle structure 10 according to an embodiment will be described below with reference to the figures. An arrow FR, an arrow UP, and an arrow RH shown in each of the figures to be described below indicate a forward direction (travel direction), an upward direction, or a rightward direction of a vehicle, respectively. As such, the direction opposite to the arrow FR, the direction opposite to the arrow UP, and the direction opposite to the arrow RH are the rearward direction, the downward direction, and the leftward direction of the vehicle, respectively. Unless specified otherwise, hereinafter when a description is given simply using a frontward and rearward direction, a leftward and rightward direction, or an upward and downward direction, the frontward and rearward direction, the leftward and rightward direction, and the upward and downward direction indicate front and rear in the frontward and rearward direction of the vehicle, left and right in the leftward and rightward direction of the vehicle (vehicle width direction), and top and bottom in the upward and downward direction of the vehicle, respectively.

Figure 1:
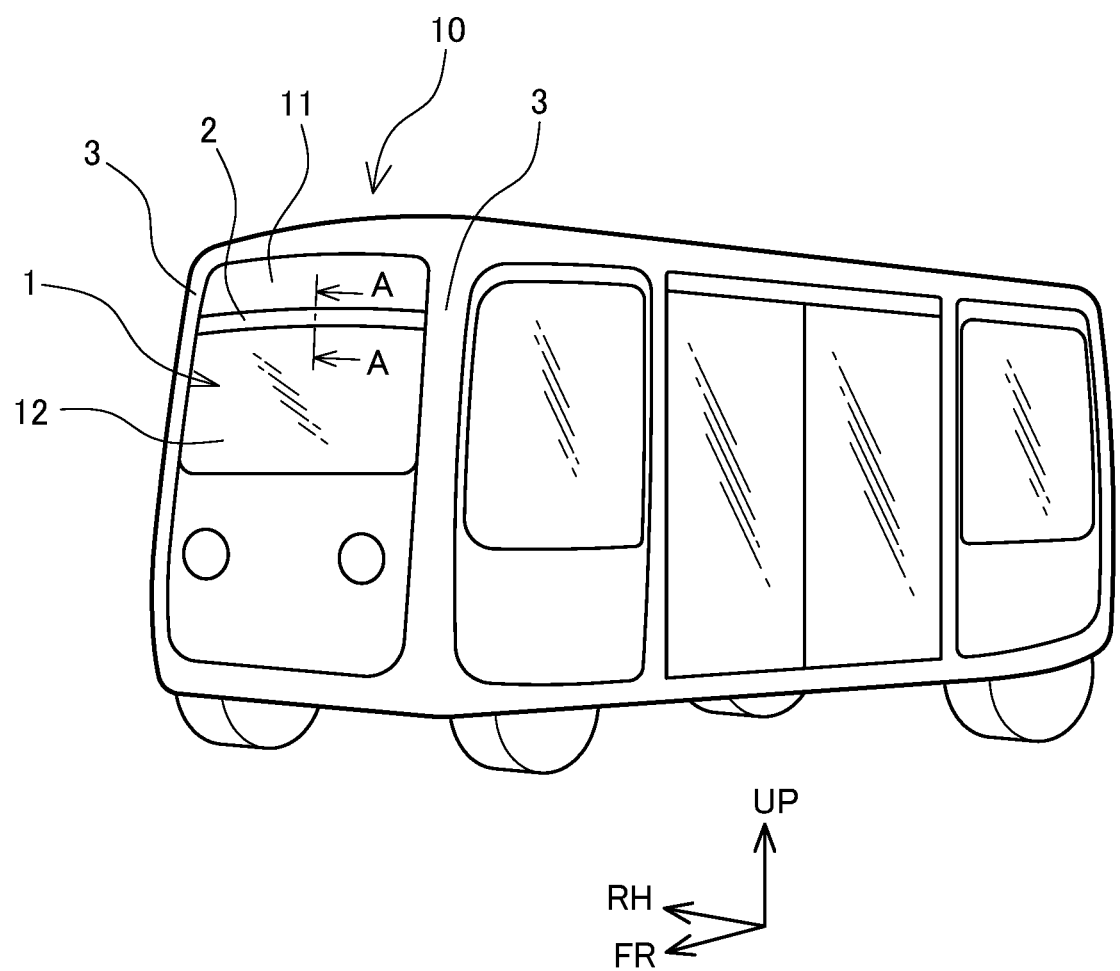
FIG. 1 is a perspective view of a vehicle structure according to an embodiment of the present disclosure.

The vehicle including the vehicle structure 10 shown in FIG. 1 is capable of self-driving. As shown in FIG. 1, the vehicle structure 10 has a windshield 1 provided at a front of the vehicle structure 10. The vehicle structure 10 includes a division bar 2 as a partition member that divides the windshield 1 into an upper windshield 11 and a lower windshield 12.

Figure 2:
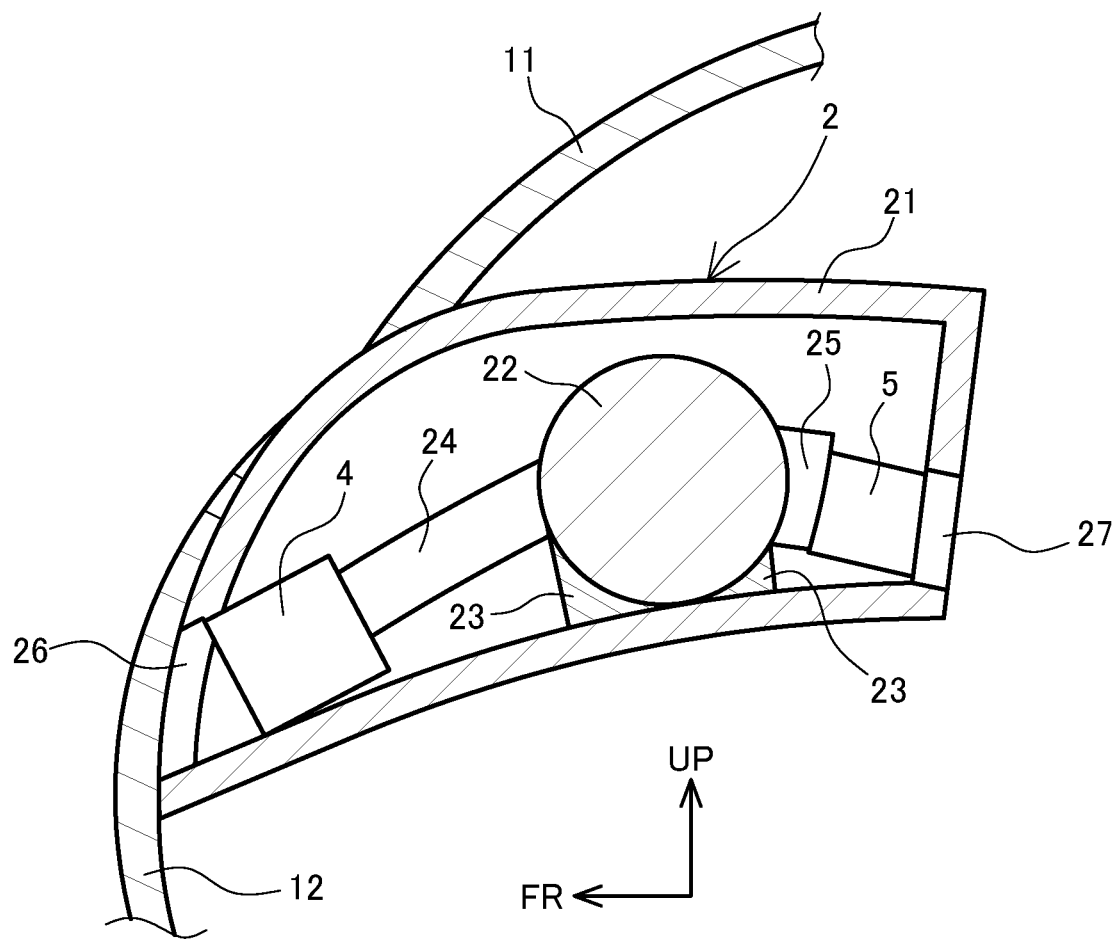
FIG. 2 is a cross-sectional view taken along line A-A of FIG. 1.

FIG. 2 is a cross-sectional view of a center of the division bar 2 in the vehicle width direction. As shown in FIG. 2, provided inside a main body 21 of the division bar 2 is a reinforcement 22 that extends in the vehicle width direction and is fixed to the main body 21 by a fixing portion 23. Left and right ends of the reinforcement 22 are both connected to a skeletal structure of a front pillar 3. Providing the reinforcement 22 connected to the skeletal structure of the front pillar 3 as described above makes it possible to maintain strength of the division bar 2 enough and increase rigidity of the vehicle structure 10.

Arranged at the center of the division bar 2 in the vehicle width direction are a vehicle outside view camera 4 and a cabin view camera 5. The vehicle outside view camera 4 and the cabin view camera 5 are used as, for example, a dashcam. The vehicle outside view camera 4 may be used for such purposes as recognizing presence or absence of an obstacle in front of the vehicle, presence or absence of a preceding vehicle, and recognizing a white line on a road surface in front of the vehicle, in order to perform self-driving. Further, the cabin view camera 5 may be used for such purposes as prevention of crime in the vehicle cabin, confirming the number of wheelchairs in a wheelchair space in the vehicle cabin, confirming the number of occupants (load factor), and face recognition of the occupants. The vehicle outside view camera 4 and the cabin view camera 5 are built in the main body 21 of the division bar 2 and are fixed to the main body 21 and the reinforcement 22. The vehicle outside view camera 4 is fixed to the reinforcement 22 with a bracket 24, and the cabin view camera 5 is fixed to the reinforcement 22 with a bracket 25. A hole 26 for recording is formed at a front of the main body 21, and the vehicle outside view camera 4 records a vehicle front view through the hole 26. A hole 27 for recording is formed at a rear of the main body 21, and the cabin view camera 5 records a vehicle cabin view through the hole 27. Wiring (not shown) of the vehicle outside view camera 4 and the cabin view camera 5 passes through the main body 21 of the division bar 2. This wiring is connected to, for example, a control device (ECU) (not shown).

Arranging the vehicle outside view camera 4 and the cabin view camera 5 on the division bar 2 as described above makes it is possible to record both the vehicle outside view and the vehicle cabin view and to mount the vehicle outside view camera 4 and the cabin view camera 5 on the front of the vehicle without employing a fixing device to mount the vehicle outside view camera 4 and the cabin view camera 5 on the windshield 1. Further, when the cameras are mounted on the inner surface of the windshield 1 with a fixing device, the experience of spaciousness of the vehicle cabin is impaired, but with the vehicle structure 10 of the present embodiment, the vehicle outside view camera 4 and the cabin view camera 5 are arranged on the division bar 2, and it is thus possible to maintain the spaciousness of the vehicle cabin.

The vehicle structure of the present disclosure is not limited to the above-described embodiment and may be implemented according to various embodiments within the scope of the present disclosure. For example, a division bar may be further provided on a vehicle rear windshield, and a vehicle outside view camera disposed on the division bar provided at a rear of the vehicle may record a vehicle rear view. Further, the vehicle outside view camera and the cabin view camera may be arranged at positions shifted in the vehicle width direction, rather than the same position in the vehicle width direction. When the vehicle outside view camera and the cabin view camera are arranged at positions shifted in the vehicle width direction as described above, the vehicle outside view camera may be disposed at the center in the vehicle width direction. Further, the vehicle outside view camera may be a stereo camera. When the vehicle outside view camera is a stereo camera, it is not necessary to dispose the vehicle outside view camera at the center in the vehicle width direction, and the cabin view camera may be disposed at the center in the vehicle width direction. Further, the cameras may be mounted protruding outward from the main body of the division bar, rather than be built in the division bar. Further, the cameras may be mounted on an upper side, lower side, or rear side of the main body of the division bar. Further, the vehicle structure of the present disclosure is also applicable to a vehicle that is not capable of self-driving.

The invention claimed is:

1. A vehicle structure comprising
    a partition member that extends in a vehicle width direction and divides at least one of a vehicle front windshield and a vehicle rear windshield into an upper windshield and a lower windshield, wherein
    a camera is disposed on the partition member.
2. The vehicle structure according to claim 1, wherein the partition member is provided with a vehicle outside view camera and a vehicle cabin view camera.
3. The vehicle structure according to claim 1, wherein provided inside the partition member is a reinforcement extending in the vehicle width direction, and left and right ends of the reinforcement are both connected to a skeletal structure of a pillar.
4. The vehicle structure according to claim 2, wherein provided inside the partition member is a reinforcement extending in the vehicle width direction, and left and right ends of the reinforcement are both connected to a skeletal structure of a pillar.

* * * * *